Aug. 18, 1970  E. DUNKELIS  3,524,524

HANDCRANK FOR LIQUID LEVEL GAUGE

Filed Sept. 16, 1968  3 Sheets-Sheet 1

INVENTOR.
Evald Dunkelis
BY Charles S. McGuire,
Attorney

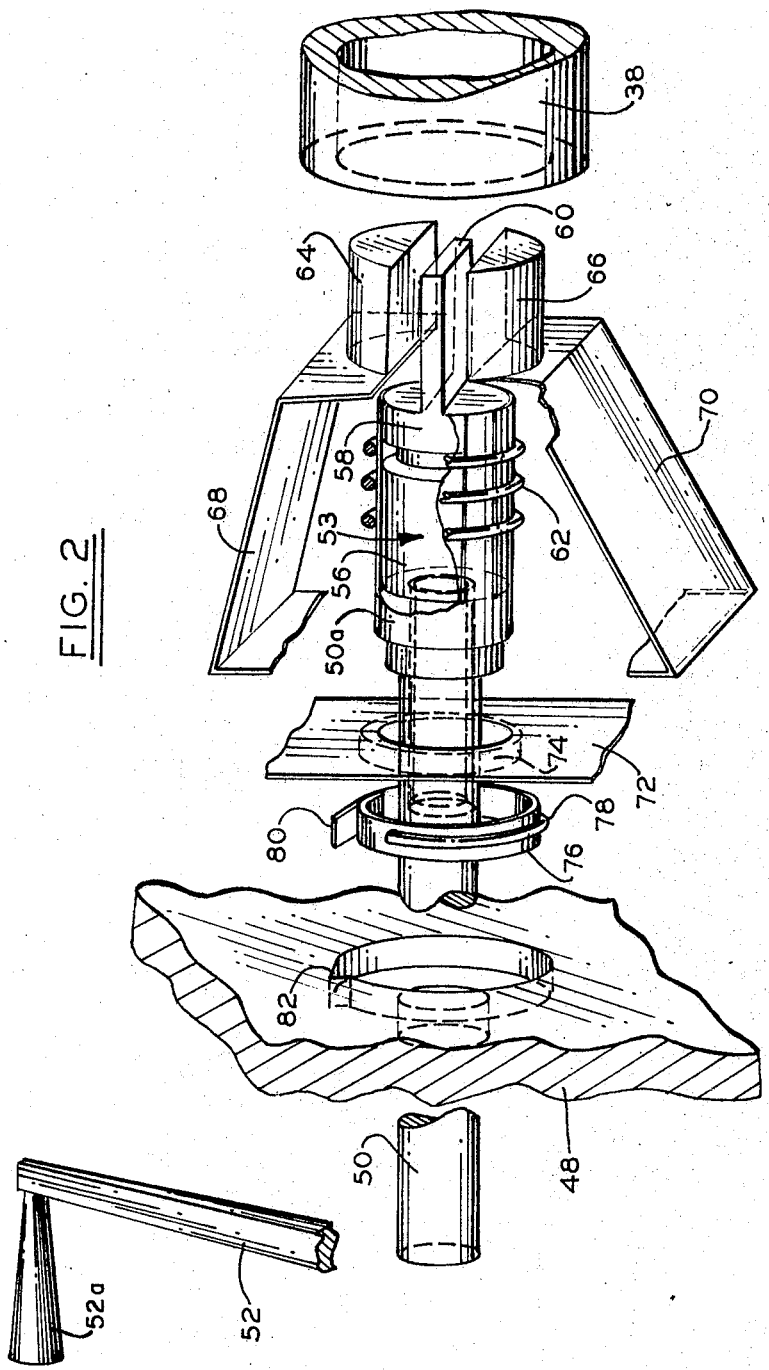

Aug. 18, 1970     E. DUNKELIS     3,524,524
HANDCRANK FOR LIQUID LEVEL GAUGE
Filed Sept. 16, 1968     3 Sheets-Sheet 3
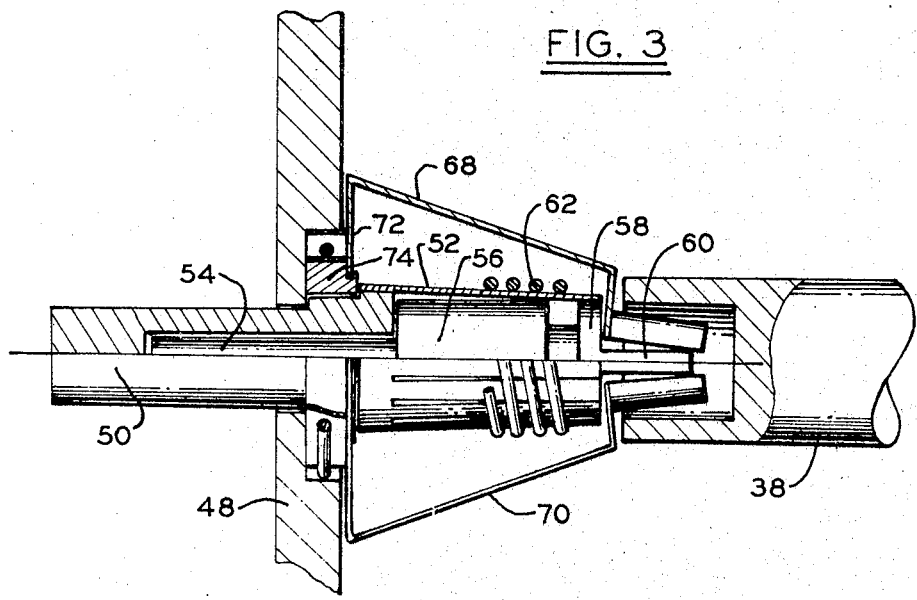
INVENTOR.
Evald Dunkelis
BY Charles S. McGuire,
Attorney United States Patent Office 3,524,524
Patented Aug. 18, 1970

3,524,524
HANDCRANK FOR LIQUID LEVEL GAUGE
Evald Dunkelis, Glen Ellyn, Ill., assignor to GPE Controls, Inc., Morton Grove, Ill., a corporation of Illinois
Filed Sept. 16, 1968, Ser. No. 762,307
Int. Cl. F16d 13/04
U.S. Cl. 192—35
9 Claims

ABSTRACT OF THE DISCLOSURE

A handcraft mechanism for rotation of a reel, or the like, wherein all elements of the mechanism are normally out of contact with the member to be rotated, but automatically engage the latter upon manual rotation of the crank in one direction. Frictional engagements between various elements of the mechanism, with slippage occurring at certain points in the operation, are utilized to provide the desired functions. The crank arrangement is especially suited for incorporation in a liquid level gauge head for raising and lowering a tank float.

This invention relates to liquid level gauging apparatus, and more specifically to a novel crank mechanism for manually raising and lowering a tank float forming a part of the gauging apparatus.

One of the most widely used types of gauging apparatus for obtaining an indication of the level of a liquid in large storage tanks comprises a float which moves vertically with the surface of the liquid, thereby raising and lowering a flexible tape which extends from the float to a gauge head externally of the tank. The gauge head may be of various designs, but normally includes a reel or drum around which the tape is coiled and uncoiled during movement of the float. Between the float and the drum, the tape may drive a sprocket wheel, or the like, which may serve to drive an electrical transducer or mechanical readout device to provide a physically observable indication of the level of liquid in the tank corresponding to the particular position of the tape.

It is sometimes desirable to raise the float to the top of the tank independently of the liquid level therein. Hand crank mechanisms are commonly provided for this purpose for engagement with the shaft upon which the tape reel rotates. The shaft should be freely rotatable as the tape winds and unwinds from the reel by movement of the float as the liquid level changes. That is, the crank mechanism would add an undesirable load to the reel if the crank remained engaged with the shaft thereof. However, it is preferred that the crank automatically engage the shaft upon manual rotation, and automatically disengage upon return of the float to the liquid surface, without the necessity of additional movement or other actuation. Crank assemblies provided for such purpose in prior art devices of this type have commonly included relatively complex and expensive ratchet and pall assemblies, and the like, involving a large number of moving parts.

A principal object of the present invention is to provide a manual crank mechanism for incorporation in a liquid level gauge head to allow movement of a float within the tank, wherein the crank is normally disengaged from the other elements of the gauge, but automatically engages and disengages in response to manual rotation in the proper direction in raising the float from and returning it to the liquid surface.

A further object is to provide a manual crank mechanism for incorporation in liquid gauging apparatus which is much more simple and inexpensive in design than similar prior art devices, while retaining the desirable operating characteristics thereof.

Still another object is to provide a novel manual crank mechanism for raising and lowering a tank float with simple, yet effective, means for preventing damage to any part of the apparatus by allowing slippage of the crank when the float reaches the limit of its movement.

Other objects of the invention will in part be obvious and will in part appear hereinafter.

The invention accordingly comprises the features of construction, combination of elements, and arrangement of parts, which will be exemplified in the construction hereinafter set forth, and the scope of the invention will be indicated in the claims.

For a fuller understanding of the nature and objects of the invention reference should be had to the following detailed description taken in connection with the accompanying drawings, in which:

FIG. 2 is an exploded perspective view of the manual crank mechanism of the invention; and FIG. 3 is a side elevational, half sectional view of the crank element of FIG. 2 in the assembled condition.

Figure 1:
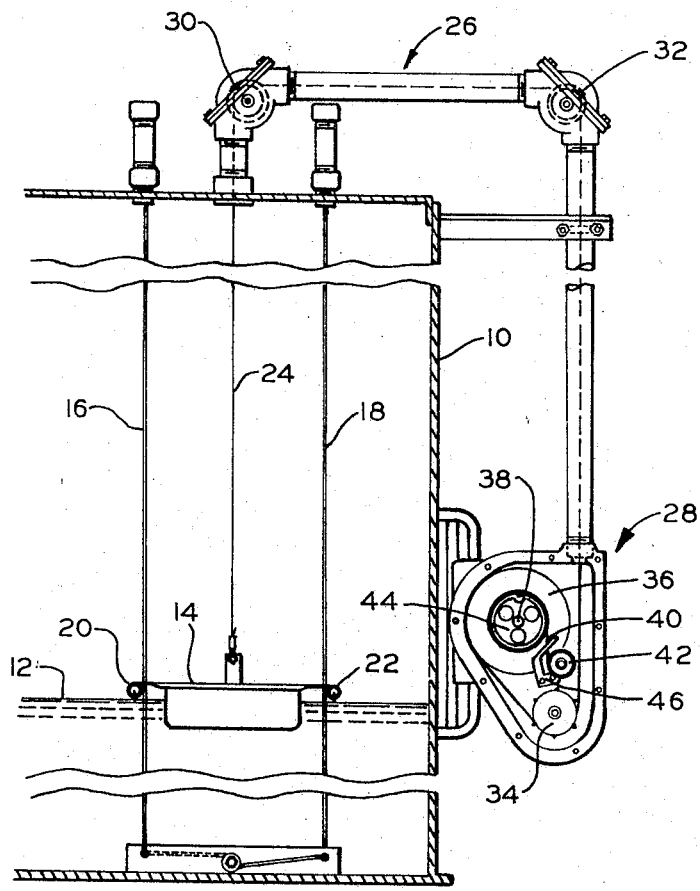
FIG. 1 is a side elevational view partly in cross-section showing a typical example of apparatus with which the present invention may be employed.

The gauging apparatus is shown in FIG. 1 as associated with a storage tank 10 having a quantity of liquid therein with a surface indicated at 12. Float 14 comprises a suitable buoyant element adapted to ride on the liquid near surface 12 with a small, predetermined displacement as the liquid level changes. The vertical path of float 14 is suitably constrained by guide members such as wires 16 and 18, held at the top and bottom by conventional anchoring devices, and passing loosely through eyelet means 20 and 22, respectively, on float 14. Gauging tape 24, normally fabricated of a suitable flexible metal, is attached at one end to float 14 and passes out of tank 10, through guide means 26, to gauge head 28. Guide means 26 may be constructed in accordance with the disclosure of U.S. Pat. No. 2,952,155 and includes suitable tubular enclosures and direction changing means 30 and 32 for tape 24.

Tape 24, in the disclosed embodiment, is perforated along its length and passes around sprocket wheel 34, causing rotation thereof as the tape moves back and forth in response to vertical movement of float 14. Tape 24 may be suitably calibrated to allow visual readings, indicating the level of liquid within the tank to be made through a window in gauge head 28, or the like, or sprocket wheel 34 may be arranged in a known manner to drive additional mechanical or electrical apparatus providing a reading of the liquid level.

Tape 24 is wound and unwound from reel 36 which is mounted for rotation on shaft 38. Counterbalancing means for the tape reel are provided in the form of negative spring 40 which is wound and unwound, in response to rotation of reel 36, between storage drum 42 and power drum 44, the latter being connected directly to reel 36. Guide member 46 serves to guide the path of spring 40 between drums 42 and 44.

As is well known to those skilled in the art, the negative spring is a pre-stressed coil component which has a tendency to wind itself onto storage drum 42 and as a result provides a slightly varying torque on the power or motor drum 44 to provide suitable counterbalancing for float 14 and the tape system. The torque output of spring 40, a preferred form of which is sold under the trade name Neg-ator spring, has a slight variation designed to compensate for the length of tape 24 which has been unwound from reel 36.

Turning now to FIGS. 2 and 3, the manual crank device of the present invention is shown in association with shaft 38 upon which tape reel 36 is shown to be mounted in FIG. 1. FIG. 2 shows a fragment 48 of the wall or cover portion of gauge head 28 which was removed in FIG. 1 to show the interior thereof. Shaft 50 extends through wall 48 and is suitably journalled for rotation therein. Crank arm 52 and handle 52a extend from a fixed connection with shaft 50 to form a manually rotatable crank on the outside of gauge head 28. Fixedly attached to the end of shaft 50 within gauge head 28 is open cylindrical member 50a which includes a series of longitudinally extending cuts from the free end thereof for an appreciable distance along its length. Cylindrical element 50a is formed of a material having such thickness and resiliency that the free (open) end thereof can be rather easily compressed due to the longitudinal cuts.

A second solid shaft member 53 includes portion 54, extending inside a hollow portion of shaft 50, and enlarged portion 56 which is positioned inside cylindrical element 50a. Connected by a section of smaller diameter to enlarged portion 56 are round end portion 58 and flat end portion 60 of the second shaft. Spring 62 encircles cylindrical element 50a and urges the deformable free end thereof into frictional engagement with round end portion 58. Thus, second shaft 53 is normally rotatable with first shaft 50 since the latter is fixedly attached to element 50a which in turn, is frictionally engaged with second shaft 53.

Shoe members 64 and 66 are supported on opposite sides of flat end portion 60 by a unitary spring element including side portions 68 and 70, respectively supporting the two shoe members, and base 72. Hollow ring 74 is affixed to base 72 and forms an opening within which shaft 50 is freely rotatable, and is mounted in a recess in wall 48, as best seen in FIG. 3. Collar 76 encircles ring 74 and is urged into frictional engagement therewith by retaining spring 78. Resilient end portion 80 extends outwardly from collar 76 and is designed to engage step 82 of the recess in wall 48, shown in FIG. 2, when rotated in a clockwise direction.

The assembly is mounted with shoe portions 64 and 66 and flat end portion 60 of shaft 53 inside a hollow end portion of shaft 38. In the normal position, that is, without rotation of the crank mechanism, shoe portions 64 and 66 are held by side portions 68 and 70 of the shoe positioning spring out of contact with the inside of shaft 38. Thus, the shaft may turn freely in either direction as the tape is wound and unwound from the reel 36 in response to changes in he liquid level within the tank. Initial rotation of the crank mechanism by manual movement of handle 52a in a clockwise direction, as viewed from a position facing gauge head 28, rotates shaft 50 and cylindrical element 50a due to the fixed attachment of the latter with shaft 50. The frictional engagement of the free end of element 52 with end portion 58 of second shaft 53 causes rotation of the second shaft in response to rotation of the first. The frictional engagement, as pointed out earlier, results from spring 62 urging the deformable free end of element 50a into contact with round end portion 58 of the second shaft. Since side portions 68 and 70 of the shoe positioning spring bias shoe members 64 and 66 into engagement with flat end portion 60, the latter will rotate the shoe members and associated spring element along with rotation of the two shafts. Collar 76 and retainer 78 are also rotated until end portion 80 makes contact with step 82 in the recess of wall 48. Such contact prevents further rotation of collar 76 in the clockwise direction, and the frictional engagement of the collar on ring 74 tends to prevent further rotation of the shoe positioning spring to which ring 74 is attached. Continued rotation of first and second shafts 50 and 53 causes flat end portion 60 to spread shoe members 64 and 66 apart until the outer surfaces thereof contact the internal surface of the opening in shaft 38. The frictional engagement of collar 76 with ring 74 is considerable less than that of shoe members 64 and 66 with shaft 38. Therefore, continued rotation of shaft 50 results in rotation of the shoe members and their associated positioning spring with collar 76 held stationary and slipping on ring 74.

The arrangement of tape 24 on reel 36 is such that rotation of shaft 38 in the above-described manner results in winding the tape upon the reel, thereby lifting float 14 along guide wires 16 and 18 toward the top of tank 10. Continued manual movement of handle 52a in a clockwise direction, along with the weight of the tape and float tending to cause counter-rotation of shaft 38, maintains the frictional engagement between shoe members 64 and 66 and the interior of the shaft. Float 14 will eventually reach the top of tank 10, thus preventing further winding of tape 24 upon reel 36.

Means are provided to prevent damage to any portion of the mechanism due to continued rotation of the crank after the float reaches the top of the tank. Such means comprise the frictional engagement of first shaft 50 with section shaft 53. Since the two shafts are not fixedly attached, continued manual rotation of shaft 50 after the float has reached the limit of its movement, thereby preventing further rotation of shaft 38, will result in slippage of the free end of element 50a upon round end portion 58 of second shaft 53. The coefficient of friction between the interior of element 50a and end portion 58 and the force by which the two are urged into engagement by spring 62 must be calculated so that essentially no slippage between the two shafts takes place as the float is raised, but that slippage does occur well within the limit of force required for breakage of tape 24 or other damage to any portions of the system.

When the float is to be again lowered in the tank the mechanism is rotated in a counter-clockwise direction. The weight of float 14 tending to rotate reel 36 and shaft 38 in a counter-clockwise direction will maintain the engagement of the shaft with shoe members 64 and 66 as the crank is counter-rotated. When the float reaches the surface of the liquid within the tank there will, of course, be no further tendency to counter-rotate shaft 38 and therefore nothing to maintain the frictional engagement therewith of the shoe members. The shoe positioning spring will return the shoe members to the position shown in FIG. 3, out of contact with the interior of shaft 38, whereby continued counter-clockwise rotation of the crank mechanism will have no effect on shaft 38, reel 36, etc. Collar 76 may turn with ring 74 and base 72 of the shoe positioning spring in a counter-clockwise direction since it is positioned to engage step 82 as a fixed stop only when rotated in the clockwise direction.

The crank construction described above provides means for manually raising and lowering a float associated with liquid level gauging apparatus in a simple and efficient manner. The crank mechanism is extremely economical in manufacture and reliable in use in comparison with prior art devices intended for the same purpose. The crank remains out of contact with the tape reel shaft, thereby exerting no undesirable load thereon during normal operation, but immediately engages the shaft upon manual rotation of the crank in a clockwise direction. Initial rotation of the crank in a counter-clockwise direction cannot cause contact with or rotation of the tape reel shaft. The elements cannot be damaged due to additional rotation of the crank after the float has reached the limit of its movement, and the float may be returned to the liquid surface by counter-rotation of the crank to prevent possible damage or malfunction of the parts due to sudden stoppage of the float if allowed to fall freely to the liquid surface. These advantages are attained by frictional engagement of portions of the mechanism to cause common rotation thereof at certain stages of operation while allowing independent rotation due to slippage of the frictional engagements during other portions of the operation. The required force of the frictional engagement of collar 76 on ring 74 and that of the free end of element 50a on end portion 58 may easily be calculated to fall within the necessary limits to provide operation of the mechanism in the desired manner. The materials and surface textures of shoe elements 64 and 66 relative to the interior surface of the hollow portion of shaft 38 must also be selected to insure that essentially no slippage occurs between such surfaces as the float is raised.

It will thus be seen that the objects set forth above, among those made apparent from the preceding description, are efficiently attained, and since certain changes may be made in the above construction without departing from the scope of the invention, it is intended that all matter contained or shown in the accompanying drawings shall be interpreted as illustrative and not in a limiting sense.

Having described my invention, what I claim as new and desire to secure by Letters Patent is:

1. A handcrank mechanism for effecting movement between first and second positions of a rotatably mounted member, said mechanism comprising, in combination:
   (a) manually engageable means mounted for selective rotation in both clockwise and counter-clockwise directions;
   (b) shoe means moveable into and out of frictional engagement with said rotatable member to effect rotation thereof when moved in engagement therewith;
   (c) a resilient member biasing said shoe means toward a position out of engagement with said rotatable member;
   (d) first means for moving said shoe means into frictional engagement with said rotatable member in response to rotation of said manually engageable means in one of said directions, and comprising an element moveable in response to rotation of said manually engageable means and positioned to contact and move said shoe means, against the biasing force of said resilient member, into frictional engagement with said rotatable member;
   (e) second means for preventing further rotation of said rotatable member while allowing further rotation of said manually engageable means when said rotatable member reaches said second position, and comprising frictional engaging means between said manually engageable means and said element, and positive stop means for said rotatable member upon reaching said second position, said frictional engaging means being constructed and arranged to allow slippage between said manually engageable means and said element in response to operation of said positive stop means; and
   (f) third means for moving said shoe means out of engagement with said rotatable member when the latter is returned to said first position.

2. The invention according to claim 1 wherein said element comprises an end portion of a shaft and said manually engageable means include a portion biased into frictional engagement with said shaft.

3. The invention according to claim 1 wherein said shoe means are mounted upon, and carried by, said resilient member.

4. The invention according to claim 3 wherein said shoe means are restrained against rotation in one of said directions prior to movement into engagement with said rotatable member, and unrestrained against rotation in the other of said directions, said first means being effective to move said shoe means into engagement with said rotatable member only when said shoe means are restrained against rotation.

5. The invention according to claim 4 wherein collar means are mounted upon a portion of said resilient member, in frictional engagement therewith, and additional means are provided to limit rotation of said collar means in said one direction, thereby restraining said resilient member and said shoe means against rotation in said one direction until said shoe means are moved into frictional engagement with said member, the frictionally engaged elements being so constructed and arranged that continued movement of said manually engageable means causes rotation of said rotatable member and shoe means through the frictional engagement thereof while said collar means remains stationary and slips on said portion of said resilient member.

6. The invention according to claim 5 wherein said rotatable member comprises a hollow-ended shaft and said shoe means extend within said hollow end.

7. A handcrank mechanism for raising and lowering a float between the surface of a liquid and the top of an enclosed tank by means of an elongated, flexible element attached at one end to said float and at the other end to a reel rotatable by said hand crank mechanism, said mechanism comprising:
   (a) a manually engageable crank member mounted for selective rotation in both clockwise and counter-clockwise directions;
   (b) shoe means normally positioned out of contact with said reel when said float is on said liquid surface;
   (c) first means moveable with said crank member to contact and move said shoe means;
   (d) second means frictionally restraining said shoe means against rotation in one of said directions while permitting rotation in the other, whereby movement of said crank means in said one direction causes translatory movement of said shoe means into frictional engagement with a surface associated with said reel;
   (e) the elements in frictional engagement being so constructed that upon movement of said shoe means into contact with said surface, the frictional engagement thereof overrides the frictional restraint of said second means, thereby allowing rotation of said shoe means with slippage of said second means; and
   (f) third means allowing continued rotation of said crank member when said float reaches the top of said tank, thereby preventing further rotation of said reel.

8. The invention according to claim 7 wherein said first means comprises a pair of shafts, the first attached to said crank member for movement thereby and the second having a portion constructed and arranged to contact and move said shoe means, and means for biasing said shafts into frictional engagement for common movement.

9. The invention according to claim 8 wherein said third means comprises a construction of said pair of shafts to cause the frictional engagement thereof to slip in response to further rotation of said crank member, and thereby said first shaft, when said float reaches the top of said tank, thereby preventing further rotation of said reel, shoe means and second shaft.

References Cited
UNITED STATES PATENTS

| | | | |
|---|---|---|---|
| 728,521 | 5/1903 | Turney | 192—36 |
| 760,089 | 5/1904 | Turney | 192—35 |
| 2,156,200 | 4/1939 | Smyers | 74—548 |
| 2,818,748 | 1/1958 | Lawson et al. | 74—548 |
| 3,327,825 | 6/1967 | Fann. | |
| 3,397,592 | 8/1968 | Müller | 74—548 |

FRED C. MATTERN, Jr., Primary Examiner

F. D. SHOEMAKER, Assistant Examiner

U.S. Cl. X.R.

64—30; 74—548; 192—54, 56, 76